United States Patent [19]

Ruehle

[11] 4,208,732

[45] Jun. 17, 1980

[54] APPARATUS AND METHOD FOR ENHANCEMENT OF THE SIGNAL-TO-NOISE RATIO IN SEISMIC DATA

[75] Inventor: William H. Ruehle, Duncanville, Tex.

[73] Assignee: Mobil Oil Corporation, New York, N.Y.

[21] Appl. No.: 657,326

[22] Filed: Feb. 11, 1976

Related U.S. Application Data

[63] Continuation-in-part of Ser. No. 399,666, Sep. 21, 1973, abandoned, which is a continuation of Ser. No. 252,443, May 11, 1972, abandoned.

[51] Int. Cl.² .............................................. G01V 1/36
[52] U.S. Cl. ...................................... 367/42; 367/52; 364/421
[58] Field of Search ................ 340/15.5 DP, 15.5 CP, 340/15.5 GC, 15.5 AF; 444/924.4, 924.41; 364/421

[56] References Cited

U.S. PATENT DOCUMENTS

| | | | |
|---|---|---|---|
| 3,016,961 | 1/1972 | Allyn et al. | 340/15.5 |
| 3,518,678 | 6/1970 | Lawrence et al. | 340/15.5 |

*Primary Examiner*—Nelson Moskowitz
*Attorney, Agent, or Firm*—C. A. Huggett; William J. Scherback

[57] ABSTRACT

In common depth point seismic exploration, seismic traces are corrected for normal moveout and stacked to form a composite trace. The composite trace is successively time shifted to provide a plurality of reference traces characterized by the normal moveout of the seismic traces. The reference traces are crosscorrelated with the seismic traces, and the resulting correlation functions are utilized to enhance the primary reflection signals of the seismic traces.

12 Claims, 9 Drawing Figures

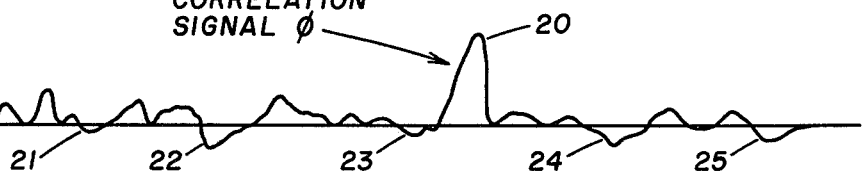
FIG. 5A  ZERO LAG CORRELATION SIGNAL $\phi$
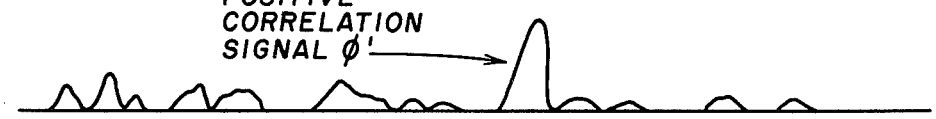
FIG. 5B  POSITIVE CORRELATION SIGNAL $\phi'$
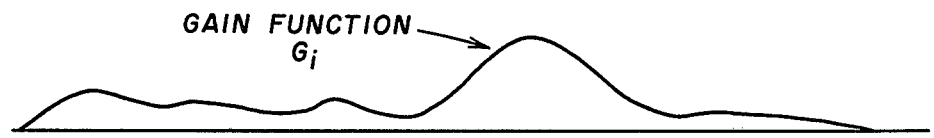
FIG. 5C  GAIN FUNCTION $G_i$
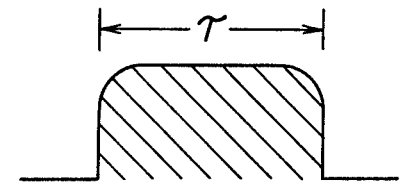
FIG. 6

APPARATUS AND METHOD FOR ENHANCEMENT OF THE SIGNAL-TO-NOISE RATIO IN SEISMIC DATA

This application is a continuation-in-part of U.S. application Ser. No. 399,666, filed Sept. 21, 1973, now abandoned which in turn was a continuation-in-part of U.S. patent application Ser. No. 252,443, filed May 11, 1972, now abandoned.

BACKGROUND OF THE INVENTION

This invention relates to a method and apparatus for enhancing the signal-to-noise ratio in a suite of seismic traces and more particularly to the use of a correlation function to enhance the primary signal reflections.

In seismic exploration seismic energy is generated at a shotpoint at or near the surface of the earth, is reflected from subsurface interfaces between layers of the earth, and is received by a spread of geophones on the surface of the earth. The geophone signals are recorded in the form of a suite of seismic traces. One common method of seismic exploration is known as common depth point exploration. In this method a number of seismic traces are recorded representing seismic energy reflections from a common reflecting point.

In such common depth point exploration it is the principal object of the geophysicist to obtain an accurate representation of the subsurface layering by interpreting between the common depth point or primary reflection signals and the various noise signals that are also recorded on the seismic traces. Such noise signals may take the form of multiples, ghosts, reverberations, ground roll, shot noise, and other types of distortion. The present invention is particularly useful in common depth point seismic exploration to eliminate multiples from the seismic traces, thereby permitting more accurate interpretation of the subsurface layering.

SUMMARY OF THE INVENTION

In accordance with one aspect of the invention, a plurality of seismic traces from a common depth point seismic exploration are recorded in a side-by-side relationship in which the primary reflection signals all fall along a generally hyperbolic curve known as the normal moveout curve. The seismic traces are compensated for the time differentials in the occurrence of the primary reflection signals caused by this normal moveout. Such compensation aligns all the reflection signals at the same point on the time axis of the seismic traces. The seismic traces are then stacked to form a composite trace which is then time shifted successively by the amounts of the time differentials of the normal moveout. The composite trace is recorded after each successive time shift to form a plurality of identical waveshape reference traces, the primary reflection signal of each reference trace falling on the same normal moveout curve that characterizes the original seismic traces. Each seismic trace is crosscorrelated at zero lag with the reference trace exhibiting the same normal moveout so as to provide a correlation function. This correlation function is utilized to enhance the primary reflection signal of the seismic trace.

In one embodiment of the invention, the correlation functions are multiplied point by point with the corresponding seismic traces to increase the primary signal-to-noise ratio of the seismic traces.

In an alternative embodiment of the invention, the correlation functions are half-wave rectified and a plurality of gain functions generated representing smoothed energy estimations of the rectified correlation functions. The gain functions are multiplied point by point with the corresponding seismic traces to increase the primary signal-to-noise ratio of the seismic traces.

In an additional embodiment, the half-wave rectified correlation functions themselves may be utilized as enhanced seismic traces.

BRIEF DESCRIPTION OF THE DRAWINGS

FIGS. 4 and 5A–5C are example waveforms that illustrate the basic steps of the process of the invention.

FIG. 6 illustrates a smoothing filter operator for use in the present invention.

DESCRIPTION OF THE PREFERRED EMBODIMENT

Figure 2:
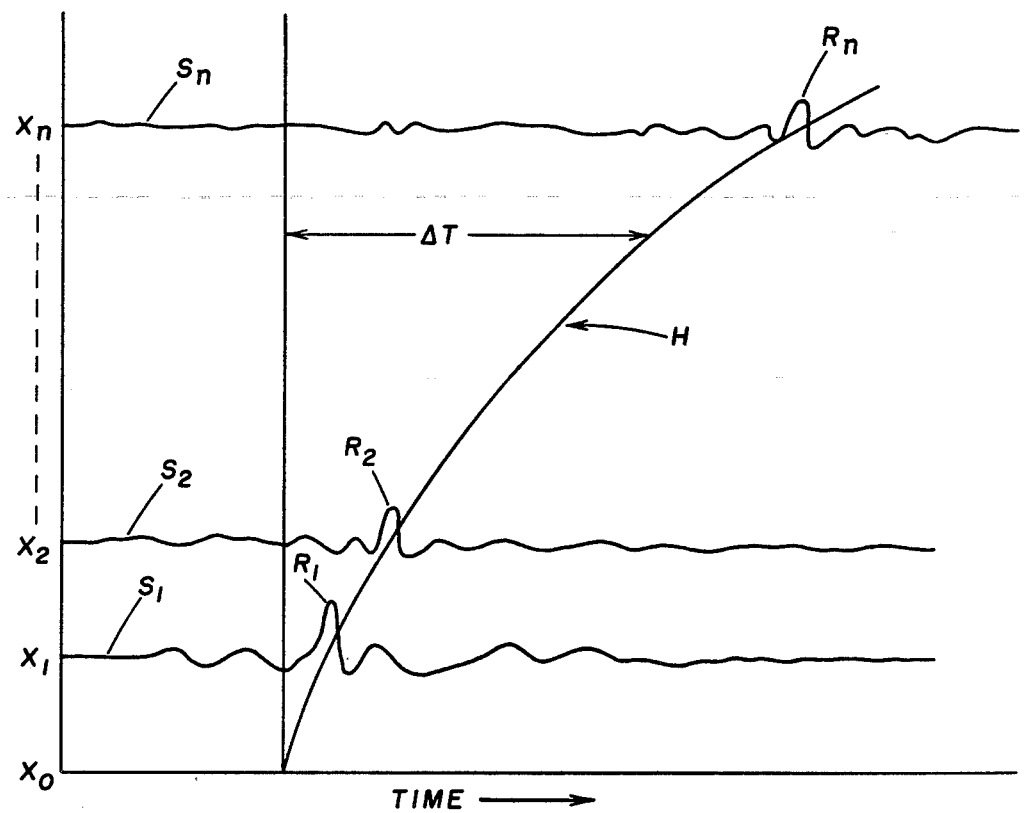
FIG. 2 is a suite of seismic traces.
Figure 1:
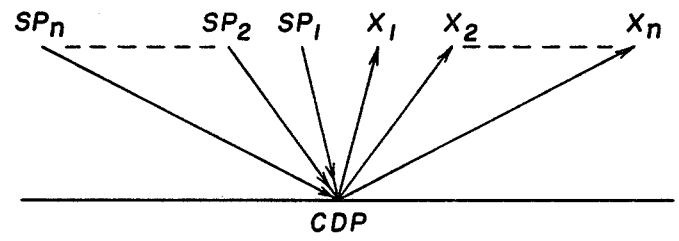
FIG. 1 illustrates a seismic exploration technique.

Referring to FIG. 1, there is illustrated one process for obtaining a suite of seismic traces. Seismic energy, produced at each of a plurality of spaced shotpoints $SP_1$–$SP_n$, is reflected from a subsurface interface at a common depth point (CDP) and is received at a plurality of spaced locations $X_1$–$X_n$ for the production of a suite of seismograms. Such a suite of seismic traces $S_1$–$S_n$ is illustrated in FIG. 2. The ordinate in FIG. 2 represents the horizontal spacing, $X_1$–$X_n$, of the receivers which produce the seismograms $S_1$–$S_n$. The reflection signals $R_1$–$R_n$ received from the common depth point reflecting surface are indicated as falling along the curve H. Curve H represents the arrival time from trace to trace of each of the reflection signals in the suite of seismograms. This curve is specified by the hyperbolic function:

$$T_x = \sqrt{T_o^2 + X^2/V^2} \tag{1}$$

where, $T_x$ is the time of the reflection on a particular seismic trace;

$T_o$ is the time of that reflection on an idealized seismic trace with a reflection point directly under the shotpoint;

X is the horizontal distance between the shotpoint and the receiver producing the particular seismic trace; and V is the acoustic velocity characteristic of the layer through which the seismic energy travels.

The time shift from trace to trace of the reflections from the common depth point surface is commonly known as normal moveout and is specified by the function:

$$\Delta T = T_o - \sqrt{T_o^2 + X^2/V^2} \tag{2}$$

Reference is made to SEISMIC PROSPECTING FOR OIL by C. Hewitt Dix, 1952, Section 8.2.3, pp. 134–137, for a further description of normal moveout determination.

Figure 3:
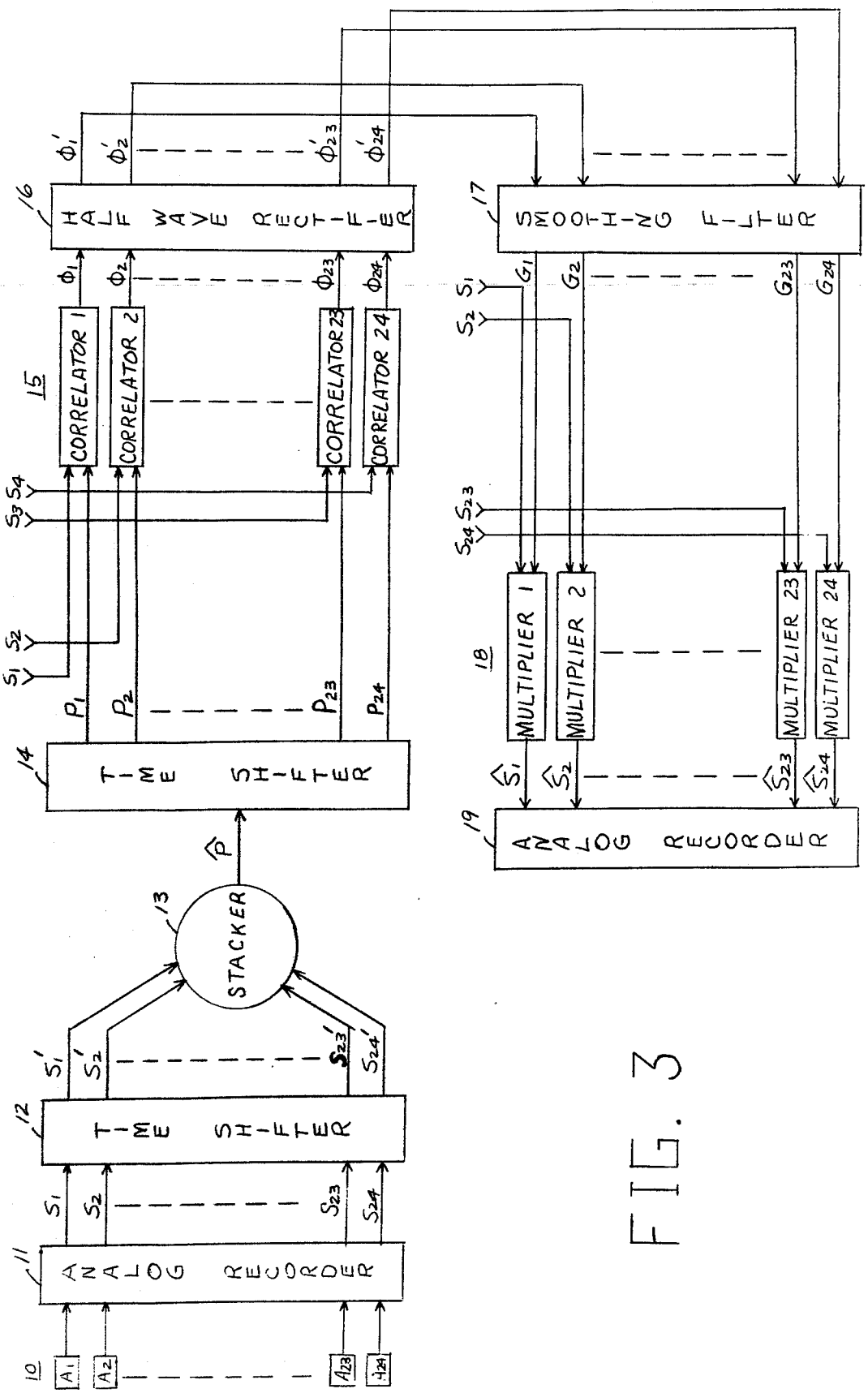
FIG. 3 is a flow sheet depicting the process of the invention.

FIG. 3 is a flow sheet of a technique performed in accordance with the present invention to enhance the signal-to-noise ratio of the common depth point seismic traces. The first step, as indicated at 10 in the flow sheet, is to correct the CDP seismic traces for normal moveout (NMO):

$$S_i' = S_i(\Delta T_i) \quad (3)$$

Figure 4:
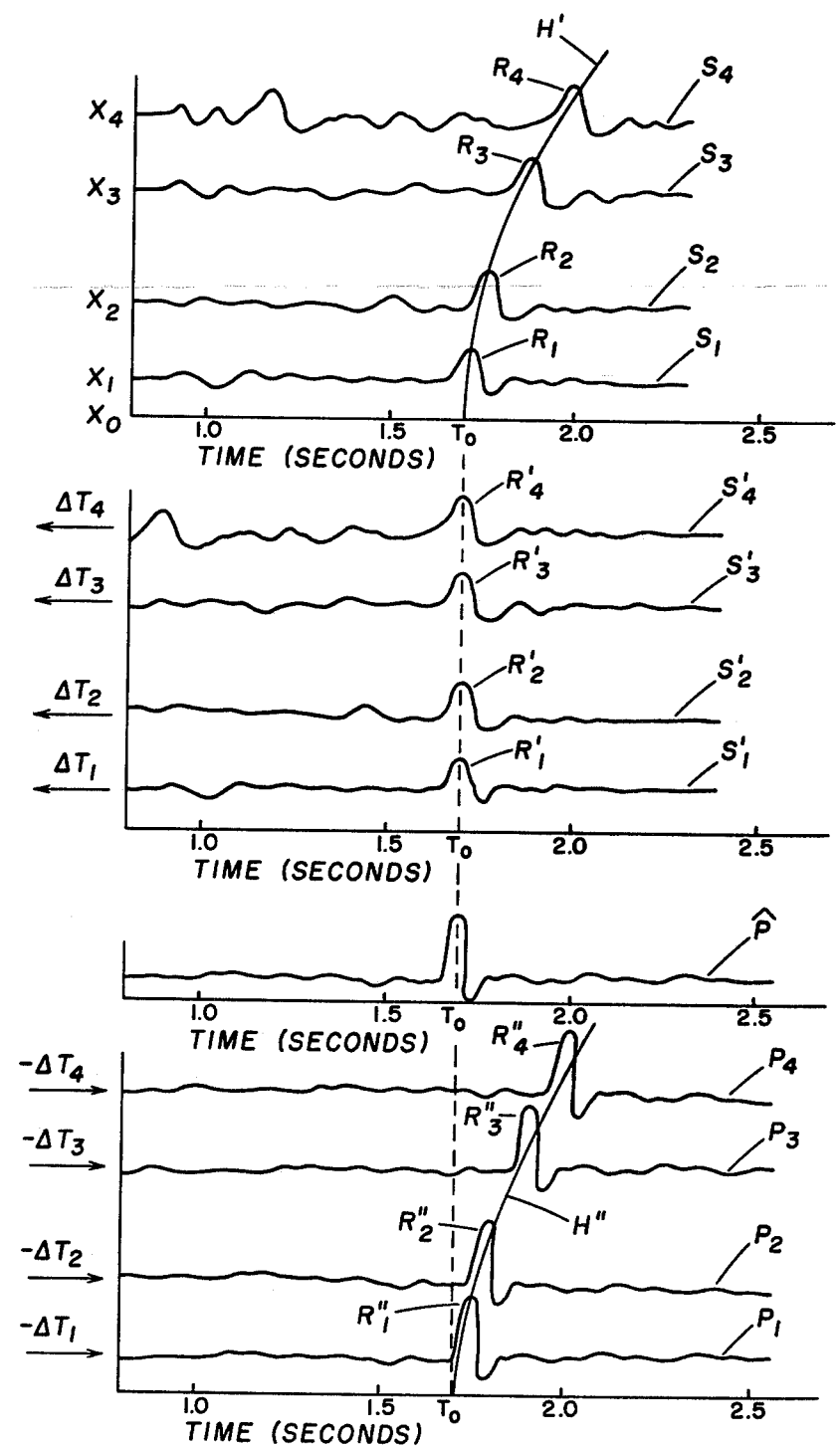

As can be seen in FIG. 4, for example, primary reflections $R_1$-$R_4$ of the seismic traces $S_1$-$S_4$ fall along the hyperbolic curve H′. By displacing the traces $S_1$-$S_4$ to the left by the amounts of $\Delta T_1$-$\Delta T_4$, respectively, the primary reflections are aligned to occur at the same time $T_o$ as indicated at $R_1'$-$R_4'$ on the traces $S_1'$-$S_4'$.

The next step in the process, as indicated at 11, is to sum the CDP seismic traces to form a single composite trace $\hat{P}$ in accordance with the following function:

$$\hat{P} = \sum_{i=1}^{n} S_i' \quad (4)$$

The four seismic traces $S_1'$-$S_4'$ are summed to form the single composite trace $\hat{P}$ as indicated in FIG. 4. From this composite trace, a plurality of reference traces are generated as indicated at 12 in the flow sheet. Reference traces $P_1$-$P_n$ correspond with each of the CDP seismic traces $S_1$-$S_n$. For example, four reference traces $P_1$-$P_4$ are illustrated in FIG. 4 to correspond with the four CDP seismic traces $S_1$-$S_4$. Traces $P_1$-$P_4$ are generated by successively displacing the composite trace $\hat{P}$ to the right by the amounts $-\Delta T_1$ through $-\Delta T_4$. It is to be noted that the reflection points $R_1''$-$R_4''$ of the traces $P_1$-$P_4$ fall along the hyperbolic curve H″ which has the same curvature as the hyperbolic curve H′ representative of the primary reflections $R_1$-$R_4$ of the CDP traces $S_1$-$S_4$.

The next step of the process, as indicated at 13 in the flow sheet, is the generation of zero lag crosscorrelation functions in accordance with the function:

$$\Phi_i = S_i \cdot P_i \quad (5)$$

Crosscorrelation functions $\Phi_1$-$\Phi_n$ are generated for the CDP seismic traces $S_1$-$S_n$ and the reference traces $P_1$-$P_n$. The CDP seismic traces $S_1$-$S_n$ are crosscorrelated with the reference traces $P_1$-$P_n$, respectively. In this type of zero lag crosscorrelation, there is no time shifting between the traces being correlated, that is, there is a straightforward multiplication point by point of the seismic traces $S_1$, for example, with the reference trace $P_1$ to obtain the correlation function $\Phi_1$. Likewise, the CDP seismic traces $S_2$-$S_n$ are multiplied point by point with the reference traces $P_2$-$P_n$, respectively, to obtain correlation functions $\Phi_2$-$\Phi_n$, respectively. A typical zero lag correlation function as obtained in this procedure is illustrated in FIG. 5A. It will be noted that if the seismic trace and the reference trace correlate quite well, the correlation function will be mostly positive due to the fact that a positive-going seismic trace multiplied by a corresponding point on a reference trace, which is likewise positive, results in a positive point on the correlation function. Likewise, a negative point on the seismic trace multiplied by a corresponding negative point on the reference trace produces a positive correlation function. The correlation function will be quite high in amplitude at the point of the primary reflections. Such a point is indicated at 20 in FIG. 5A. One such correlation function is generated for each of the CDP seismic traces.

It is these correlation functions which are utilized in the present invention to enhance the signal-to-noise ratio of the CDP seismic traces. In one embodiment of the present invention, the correlation functions $\Phi_1$-$\Phi_n$ are applied directly to the CDP seismic traces $S_1$-$S_n$ as indicated at 14 in the flow sheet. In this application the correlation functions are multiplied point by point with the CDP seismic traces. This multiplication enhances the primary reflection signals with respect to noise signals in the seismic traces.

In a second embodiment of the present invention, steps as indicated at 15, 16, and 17 in the flow sheet are performed. In the step indicated at 15, the crosscorrelation function $\Phi_i$ is half-wave rectified to generate the function $\Phi_i'$. As illustrated in the example of FIG. 5A, the crosscorrelation function $\Phi$ is negative at points 21-25. In FIG. 5B, the negative-going portions are eliminated, resulting in the positive correlation function $\Phi'$. Positive correlation functions $\Phi_1'$-$\Phi_n'$ are generated by the half-wave rectification process for each of the crosscorrelation functions $\Phi_1$-$\Phi_n$, respectively.

In the next step, as indicated at 16 in the flow sheet, the positive correlation function $\Phi'$ is modified or operated upon by a smoothing filter operator h to generate the gain function $G_i$. Such operation may be carried out by the digital filtering process commonly known as convolution. Reference is made to "The Digital Processing of Seismic Data", by Daniel Silverman, GEOPHYSICS, Vol. XXXII, No. 6 (December, 1967), pp. 992-993, for a detailed description of convolution filtering. Basically, convolution can be described in the terms of the present invention by the relationship:

$$G_i = \Phi' * h \quad (6)$$

where, $\Phi'$ = positive correlation function,
h = smoothing filter operator,
* = symbol designating convolution, and
$G_i$ = gain function.

The convolution process is carried out by successively shifting the operator h down the correlation function and cross-multiplying the operator h with the correlation function $\Phi'$. This process is the step-by-step solution of the convolution integral:

$$\int_0^t \Phi'(\tau) h(t - \tau) d\tau \quad (7)$$

where, $\tau$ is the shifting time interval.

The gain functions $G_1$-$G_n$ are generated by the described convolution process for each of the positive correlation functions $\Phi_1'$-$\Phi_n'$, respectively.

The smoothing filter operator used preferably in accordance with the invention is the moving operator illustrated in FIG. 6. The shifting interval $\tau$ is the time interval over which it is desired to smooth the correlation function. The length of the shifting interval $\tau$ may vary; however, a particularly suitable interval for enhancing the primary reflection signals of the seismic traces is an interval of 40 milliseconds.

In the final step of this second embodiment of the invention, as indicated at 17 in the flow sheet, the gain function $G_i$ is applied directly to the CDP sismic trace $S_i$:

$$\hat{S}_i = S_i \cdot G_i \quad (8)$$

Accordingly, the gain functions $G_1$–$G_n$ are multiplied point by point with the CDP seismic traces $S_1$–$S_n$ to generate the enhanced seismic signals $\hat{S}_1$–$\hat{S}_n$. As previously discussed in connection with the step indicated at 14 in the flow sheet, this multiplication enhances the primary reflection signals with respect to noise signals in the seismic traces.

Alternatively to the utilization of the positive correlation functions $\Phi_i'$ to enhance the signal-to-noise ratio of the CDP seismic traces, the functions $\Phi_i'$ may themselves be processed as enhanced seismic signals.

The foregoing-described process of the present invention may be machine implemented by means of conventional analog computing systems or by means of conventional digital computing systems. In a preferred mode, a digital field recorder is used to record the seismic signal outputs of the geophones, and a conventional general-purpose digital computer is utilized to carry out the process of the present invention on the digitally recorded field data. One particular computing system which is suitable for use in the Control Data Corporation Model 6600 Digital Computer, and includes the following input/output components:

Control Computer, 65K Memory
6602 Console Display
6681 Data Channel Converter
405 Card Reader
3447 Card Reader Controller
501 Line Printer
3256 Line Printer Controller A particular plotter that is suitable for use with this preferred computing system is the Calcomp Plotter Model 763.

Figure 7:
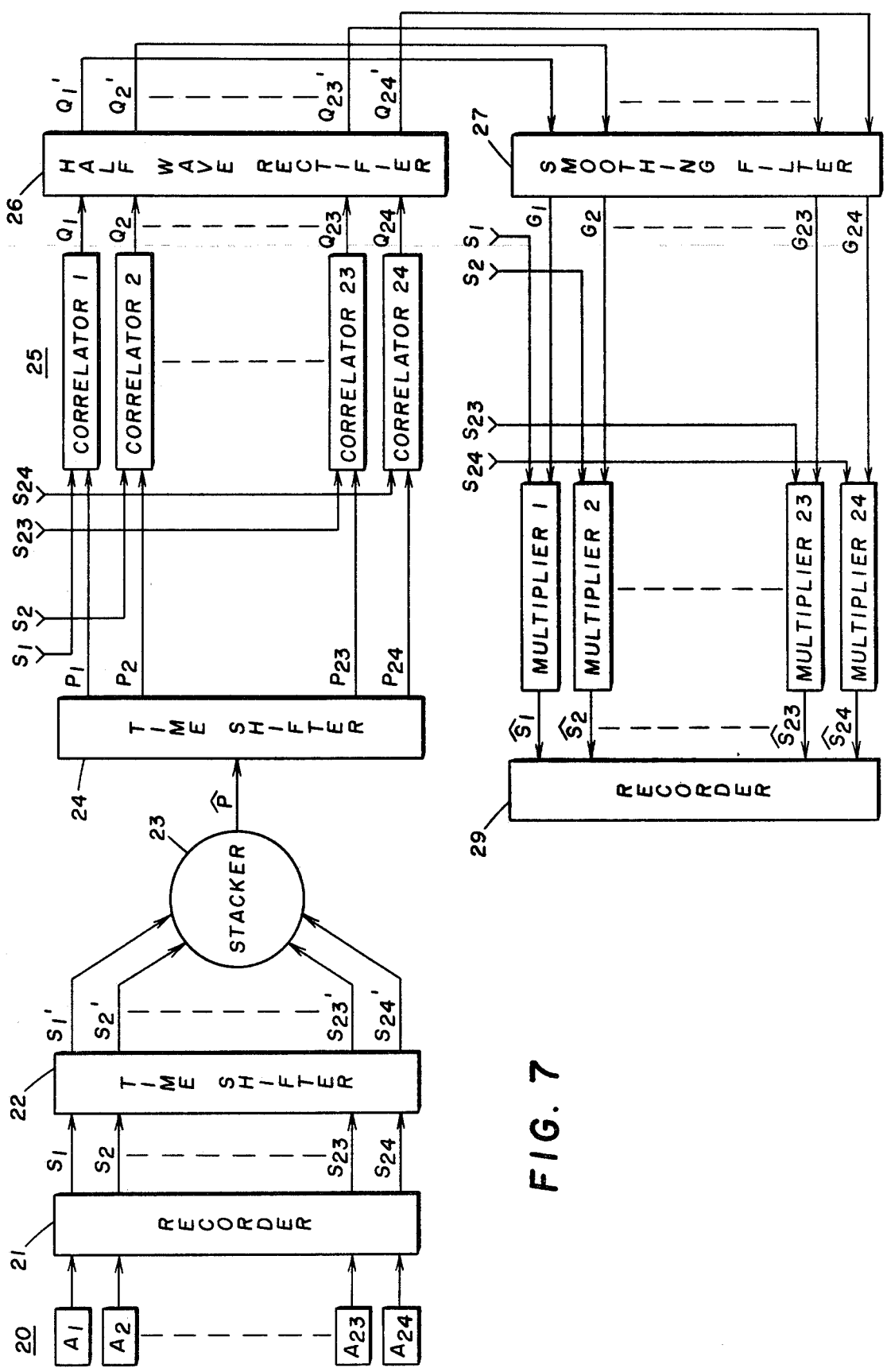
FIG. 7 illustrates apparatus for carrying out the process of the present invention.

Referring now to FIG. 7, there is illustrated an alternate embodiment of a computing system for implementing the present invention. A plurality of geophones 20, twenty-four being illustrated for purposes of example, are spread along the surface of the earth to receive seismic energy generated by at least one energy source located at or near the surface of the earth and reflected from the subsurface layering. The signals from geophones $A_1$–$A_{24}$ are recorded on a field recorder 21 in the form of a suite of common depth point seismic traces $S_1$–$S_{24}$. These seismic traces are then applied to the computing system including units 22–29 and processed in accordance with the foregoing-described steps 10–17 of FIG. 3. A time shift unit 22 corrects each trace in accordance with step 10 for the effects of normal movement in common depth point seismic exploration. The normal moveout corrected traces $S_1'$–$S_{24}'$ are then stacked or combined together by the stacker 23 to provide the single composite trace $\hat{P}$ in accordance with step 11.

The composite trace $\hat{P}$ is applied to a second time shifter 24 which provides for a plurality of reference traces $P_1$–$P_{24}$ in accordance with step 12. Reference traces $P_1$–$P_{24}$ correspond with each of the CDP seismic traces $S_1$–$S_{24}$. For example, the four reference traces $P_1$–$P_4$ illustrated in FIG. 4 correspond with the four CDP seismic traces $S_1$–$S_4$.

The CDP seismic traces $S_1$–$S_{24}$ are next crosscorrelated as indicated in step 13 with these reference traces $P_1$–$P_{24}$, respectively, by means of the plurality of correlators 25. The output of the correlators are zero lag crosscorrelation signals $\Phi_1$–$\Phi_{24}$. One such correlation signal is generated for each of the CDP seismic traces.

These correlation signals $\Phi_1$–$\Phi_{24}$ are then applied to a half-wave rectifier 26. As illustrated in the example of FIG. 5A, a typical crosscorrelation signal $\Phi$ may be negative at points 21–25. Consequently, any negative-going portions of such crosscorrelation signal $\Phi$ are eliminated by the half-wave rectifier 26, resulting in a positive correlation signal $\Phi'$ of FIG. 5B. Accordingly, positive correlation signals $\Phi_1'$–$\Phi_{24}'$ are generated by the half-wave rectifier 26 for each of the crosscorrelation signals $\Phi_1$–$\Phi_{24}$, respectively, in accordance with step 15.

These positive correlation signals $\Phi_1'$–$\Phi_{24}'$ are next applied to a smoothing filter 27 which smooths each positive correlation signal to provide the corresponding gain signals $G_1$–$G_{24}$ in accordance with step 16.

Finally, the gain signals $G_1$–$G_{24}$ are applied to the multipliers 28 where they are multiplied point by point with their corresponding CDP seismic traces $S_1$–$S_{24}$ in accordance with step 17 to generate the enhanced seismic signals $\hat{S}_1$–$\hat{S}_{24}$ for recording on the recorder 29. By this multiplication operation, the primary reflection signals of the CDP seismic traces are enhanced with respect to the noise signals when recorded on recorder 29 as the signals $\hat{S}_1$–$\hat{S}_{24}$.

In an alternate embodiment of the invention, the half-wave rectifier 26 and smoothing filter 27 may be eliminated and the correlation signals $\Phi_1$–$\Phi_{24}$ applied directly to the multipliers 28 for multiplication point by point with the corresponding CDP seismic traces $S_1$–$S_{24}$ in accordance with step 14. In this alternate embodiment, the primary reflection signals will also be enhanced with respect to the noise signals in the seismic traces, however, not to the extent of the enhancement obtained by the utilization of the half-wave rectifier 26 and smoothing filter 27.

Alternatively to enhancing the signal-to-noise ratio of the CDP seismic traces $S_1$–$S_{24}$, the positive correlation signals $\Phi_1'$–$\Phi_{24}'$ from step 15 may themselves be utilized as enhanced seismic signals and recorded on the recorder 29.

Any number of conventional components and circuits may be utilized for the units 22–29 to record and process the seismic signals received at the geophones 20 and recorded on recorder 21. Suitable time shifters 22 and 24, stacker 23, and recorder 29 are illustrated and described in U.S. Pat. No. 3,697,939 to A. W. Musgrave. Conventional circuits, well known to those skilled in the art, may be utilized for the correlators 25, rectifier 26, filter 27, and multipliers 28.

I claim:

1. A system for enhancing primary seismic reflection signals recorded in the form of common depth point seismic traces, comprising:
   (a) means for shifting each of said plurality of seismic traces along the time axis to compensate for time differentials in the occurrence of primary reflection signals between adjacent seismic traces caused by normal moveout,
   (b) means for combining said plurality of seismic traces after correction for normal moveout to form a composite trace,
   (c) means for generating from said composite trace a plurality of reference traces equal in number to the number of seismic traces, said composite trace being successively shifted along the time axis by the amounts of the time differentials caused by said normal moveout and recorded after each successive shift, thereby providing reference traces in which the primary reflection signals follow the same normal moveout that characterizes the seismic traces, (d) means for crosscorrelating each of said plurality of reference traces with the corresponding one of said plurality of seismic traces at the point of zero time lag between the traces to provide a plurality of correlation signals, one correlation signal for each of said plurality of seismic traces, and (e) means for utilizing said correlation signals to enhance the common primary reflection signals of the corresponding seismic traces.

2. The system of claim 1 wherein said means for utilizing said correlation signals comprises means for multiplying each of said plurality of seismic traces with the corresponding ones of said correlation signals.

3. The system as set forth in claim 1 wherein said means for utilizing said correlation signals comprises:

(a) means for generating half-wave rectified correlation signals, (b) means for filtering said half-wave rectified correlation signals to eliminate random variations due to high-frequency components and thereby product a plurality of gain signals representing smoothed energy estimations, each of said gain signals being associated with one of said seismic traces, and (c) means for multiplying each of said plurality of seismic traces with its associated gain signal.

4. The system of claim 3 wherein the half-wave rectified correlation signals are generated by the elimination of the negative-going portions of said correlation signals.

5. Apparatus for enhancing primary reflection signals from a plurality of seismic energy sources which have been recorded in the form of a plurality of common depth point seismic traces, comprising:

(a) a plurality of first time shifters to which said plurality of seismic traces are applied, each of said seismic traces being displaced along the time axis to compensate for time differentials in the occurrence of primary reflection signals between adjacent seismic traces caused by normal moveout, (b) a stacker which combines said plurality of seismic traces after correction for normal moveout by said first time shifters to form a composite trace, (c) a second time shifter to which said composite trace is applied, said composite trace being successively shifted along the time axis by the amounts of the time differentials caused by said normal moveout and recorded after each successive shift to produce a plurality of reference traces equal in number to said seismic traces whereby the primary reflection signals in the reference traces follow the same normal moveout that characterizes the seismic traces, (d) a plurality of correlators to which said plurality of reference traces are applied along with the corresponding plurality of seismic traces at the point of zero time lag, said correlators crosscorrelating each of said reference traces with its corresponding seismic trace to produce a plurality of correlation signals, (e) a plurality of half-wave rectifiers to which said correlation signals are applied, said rectifiers eliminating the negative portions of said correlation signals to produce rectified correlation signals, (f) a plurality of smoothing filters to which said rectified correlation signals are applied, said filteres eliminating random variations in said rectified correlation signals due to high-frequency components to produce rectified and filtered correlation signals, and (g) a plurality of multipliers which multiply each of said rectified and filtered correlation signals point by point with the corresponding ones of said seismic traces.

6. A machine implemented method of enhancing the signal-to-noise ratio of a plurality of seismic traces which have been corrected for normal moveout, comprising:

(a) summing said seismic traces to obtain a composite trace, (b) generating a plurality of reference traces by shifting said composite trace along the time axis in accordance with the normal moveout of said seismic traces, said reference traces being equal in number to the number of seismic traces, (c) crosscorrelating said reference traces with said seismic traces at the point of zero time lag between the reference and seismic traces to provide a plurality of correlation signals, each correlation signal corresponding with one of said seismic traces, and (d) utilizing said correlation signals to enhance the signal-to-noise ratio in said seismic traces.

7. The method as set forth in claim 6 wherein the step of utilizing said correlation functions comprises the multiplication of said correlation signals with the corresponding seismic traces.

8. The method as set forth in claim 6 wherein the step of utilizing said correlation signals comprises:

(a) generating half-wave rectified correlation signals, (b) smoothing said half-wave rectified correlation signals to provide a gain signal associated with each of said seismic traces, and (c) multiplying each of said seismic traces by its associated gain signal.

9. A machine implemented method of processing a plurality of seismic traces which have been corrected for normal moveout, comprising:

(a) summing said seismic traces to obtain a composite trace, (b) generating a plurality of reference traces by shifting said composite trace along the time axis in accordance with the normal moveout of said seismic traces, said reference traces being equal in number to the number of seismic traces, (c) crosscorrelating said reference traces with said seismic traces at the point of zero time lag between the reference and seismic traces to provide a plurality of correlation signals, each correlation signal corresponding with one of said seismic traces, (d) half-wave rectifying said correlation signals to obtain positive correlation signals, and (e) utilizing said positive correlation signals as enhanced seismic signals.

10. The method of seismic exploration for the location of subsurface layers of the earth comprising:

generating an input of seismic energy, recording seismic traces representing said energy reflected from subsurface interfaces of the earth received at geophones spaced along a line of exploration, time shifting each of said seismic traces to compensate for time differentials in the occurrence of primary reflection signals between seismic traces from adjacent geophones caused by normal moveout, stacking said seismic traces after correction for normal moveout to form a composite trace, time shifting said composite trace by the time differentials of said normal moveout to produce a plurality of reference traces in which the primary reflection signals have the same normal moveout as the original seismic traces, cross correlating each of said reference traces with the corresponding original seismic trace to produce a plurality of correlation signals, filtering said correlation signals to eliminate high frequency components and to produce a plurality of gain signals, and changing the gain of said original seismic traces under control of the associated gain signals to produce enhanced primary reflections which identify the subsurface layers of the earth.

11. The method recited in claim 10 wherein seismic energy is generated at each of a plurality of spaced points along said line of exploration and wherein said energy reflected from a subsurface interface at a common depth point is recorded at a plurality of spaced locations along said line of exploration to produce said seismic traces.

12. In seismic exploration for the location of subsurface layers of the earth wherein seismic energy is applied to the earth at a plurality of spaced locations along a line of exploration, reflected from a subsurface interface at a common depth point, and recorded on a storage medium at a plurality of spaced locations to produce seismic traces, the new use of computing apparatus to enhance the likelihood of identifying said subsurface interfaces from said seismic traces comprising:

time shifting each of said seismic traces to compensate for time differentials in the occurrence of primary reflection signals between seismic traces from adjacent geophones caused by normal moveout, stacking said seismic traces after correction for normal moveout to form a composite trace, time shifting said composite trace by the time differentials of said normal moveout to produce a plurality of reference traces in which the primary reflection signals have the same normal moveout as the original seismic traces, cross correlating each of said reference traces with the corresponding original seismic trace to produce a plurality of correlation signals, filtering said correlation signals to eliminate high frequency components and to produce a plurality of gain signals, and changing the gain of said original seismic traces under control of the associated gain signals to produce enhanced primary reflections which identify the subsurface layers of the earth.

* * * * *

UNITED STATES PATENT AND TRADEMARK OFFICE
CERTIFICATE OF CORRECTION

PATENT NO. : 4,208,732
DATED : June 17, 1980
INVENTOR(S) : William H. Ruehle

It is certified that error appears in the above–identified patent and that said Letters Patent are hereby corrected as shown below:

Column 5, line 50, "movement" should read --moveout--.
Column 7, line 23, "product" should read --produce--.
Column 7, line 68, "filteres" should read --filters--.
Column 4, line 24, "h" should read --h--. Column 4, line 42, "h" should read --h--. Column 4, line 44, "h" should read --h--.

Signed and Sealed this

Ninth Day of September 1980

[SEAL]

Attest:

SIDNEY A. DIAMOND

Attesting Officer    Commissioner of Patents and Trademarks